Oct. 4, 1955
F. A. THOMANN ET AL
2,719,394
TRACTOR-MOUNTABLE HARVESTER
Filed July 8, 1954
6 Sheets-Sheet 1
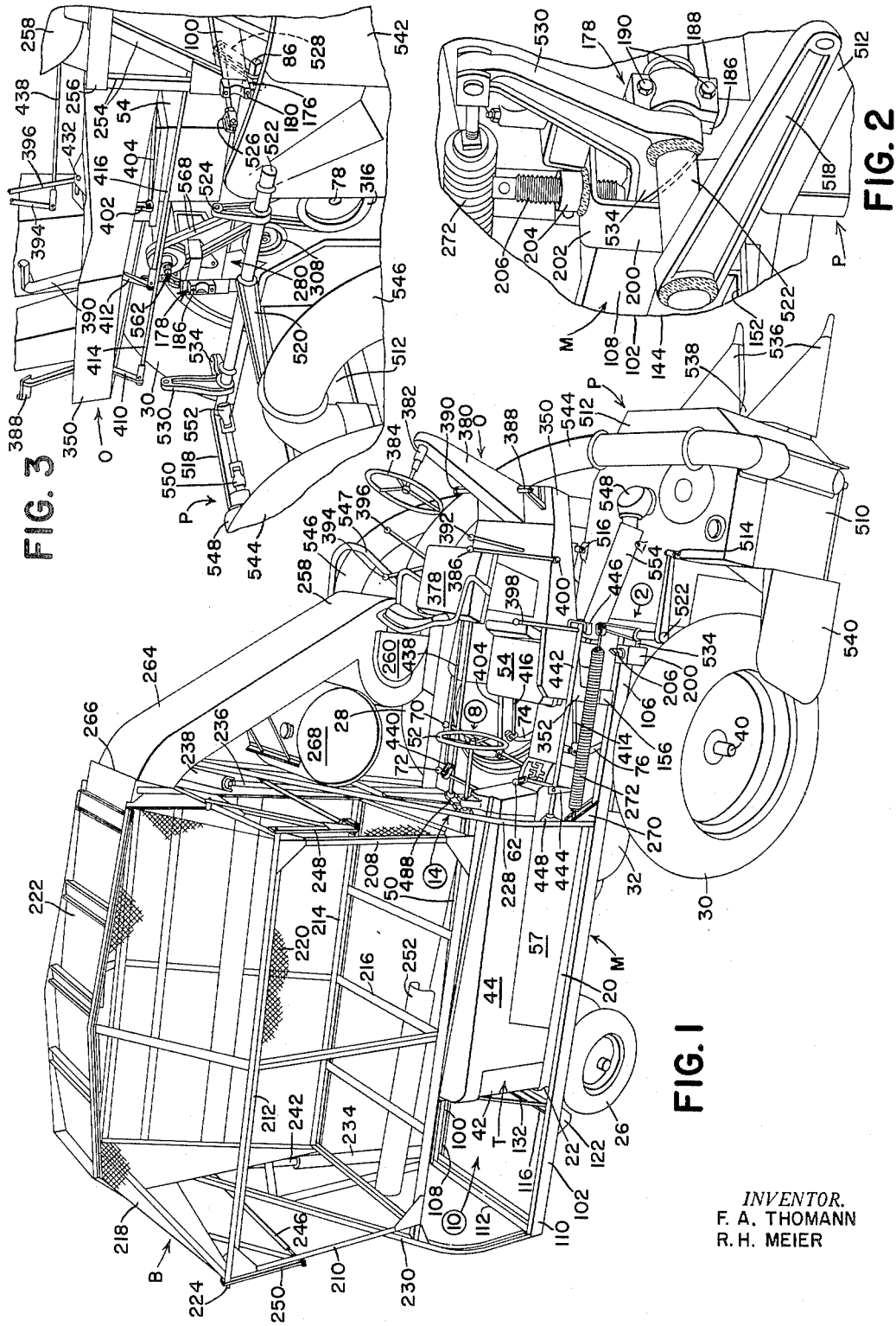
INVENTOR.
F. A. THOMANN
R. H. MEIER

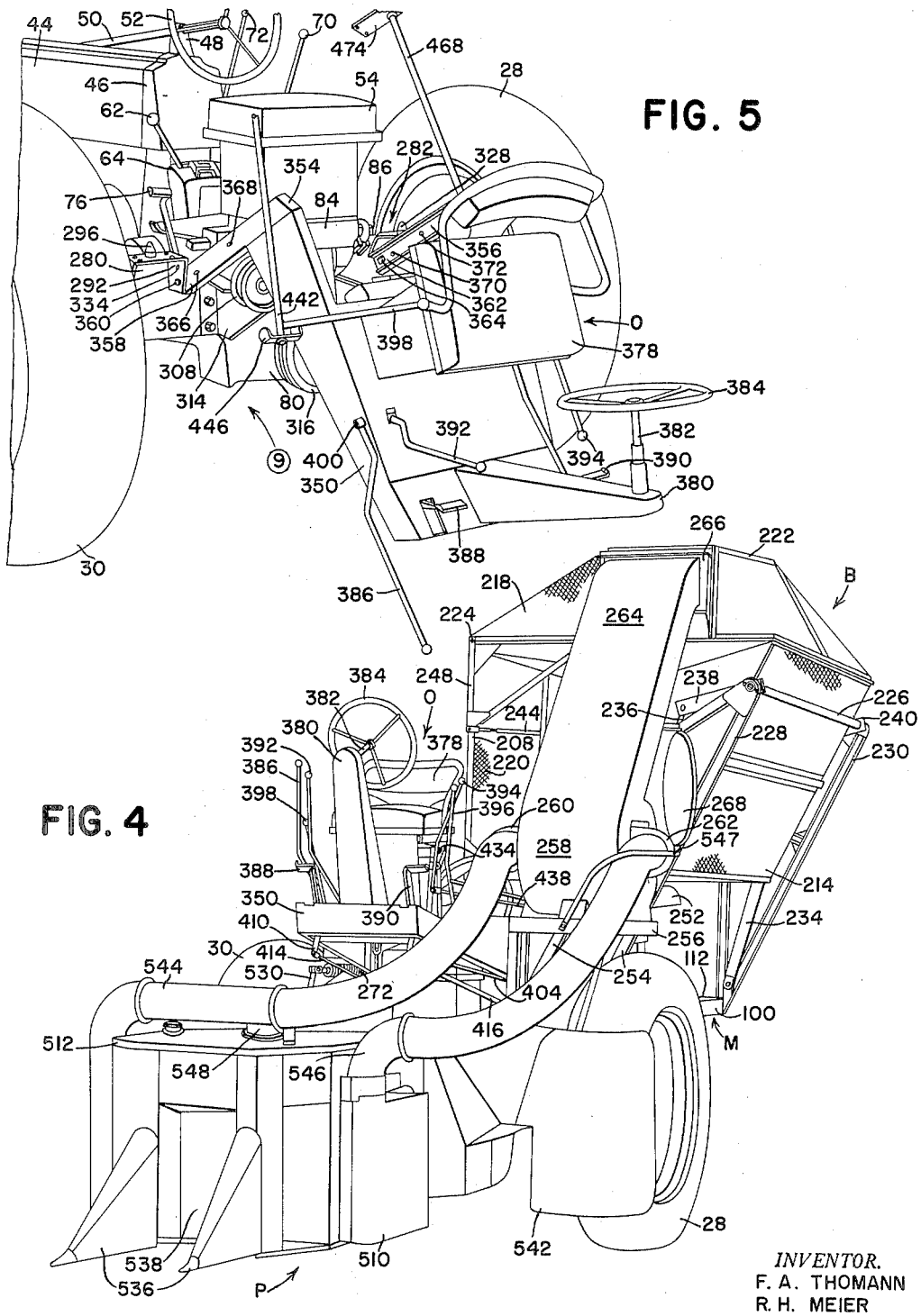

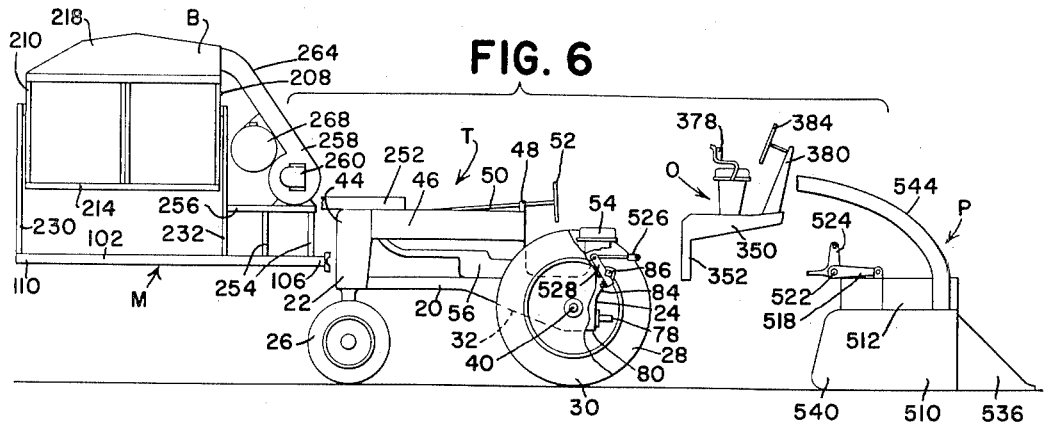
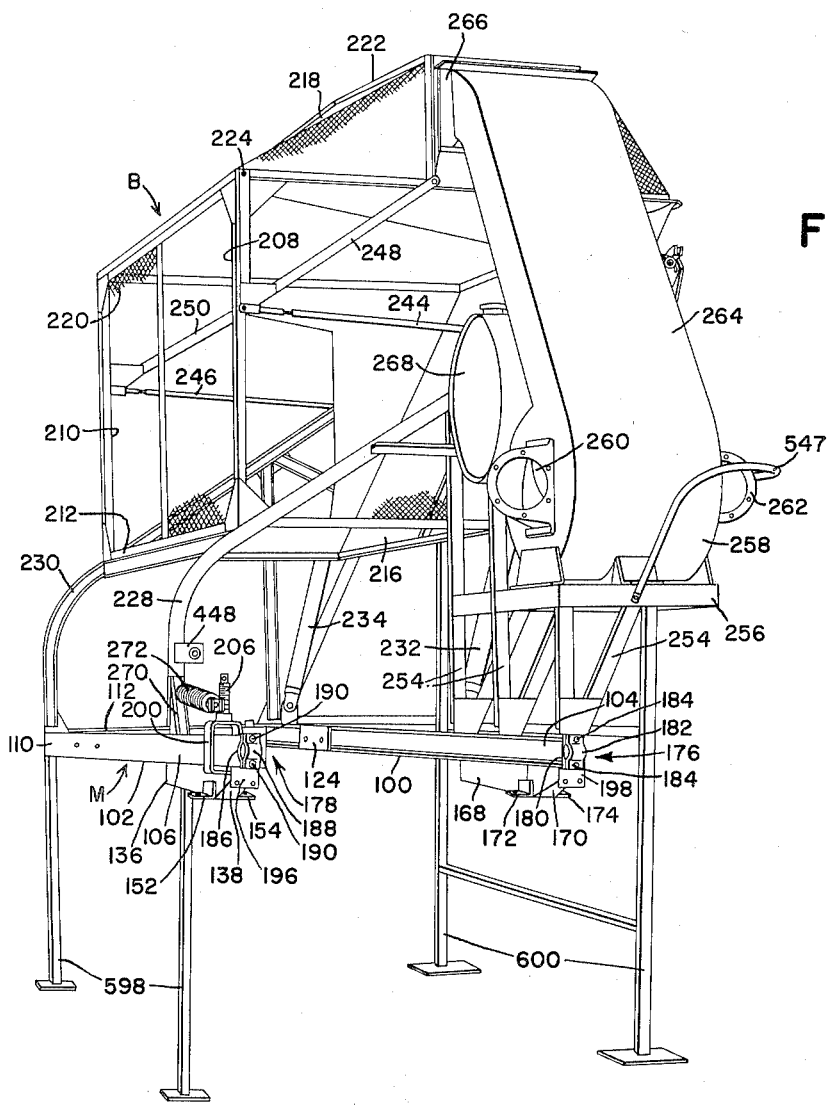

INVENTOR.
F. A. THOMANN
R. H. MEIER

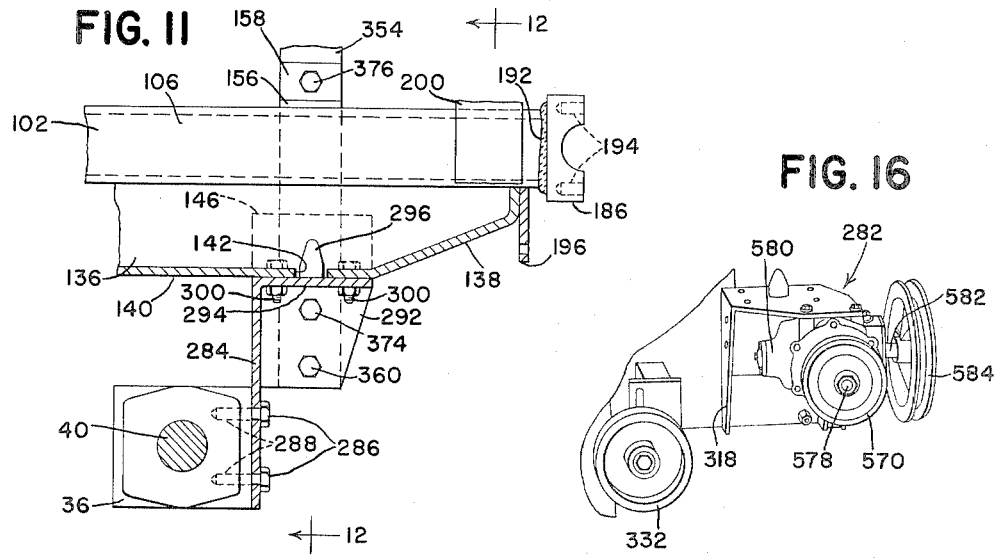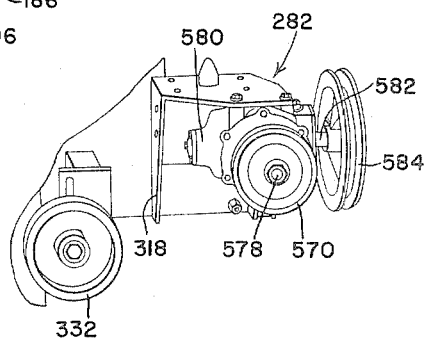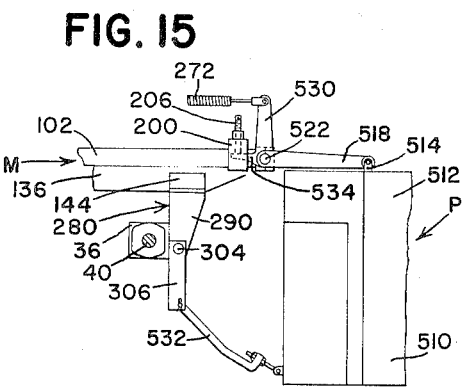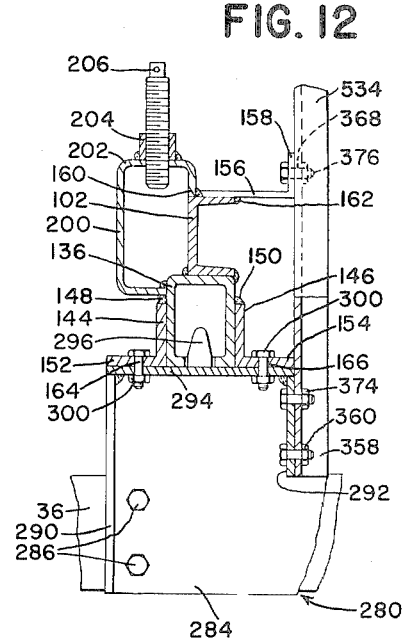

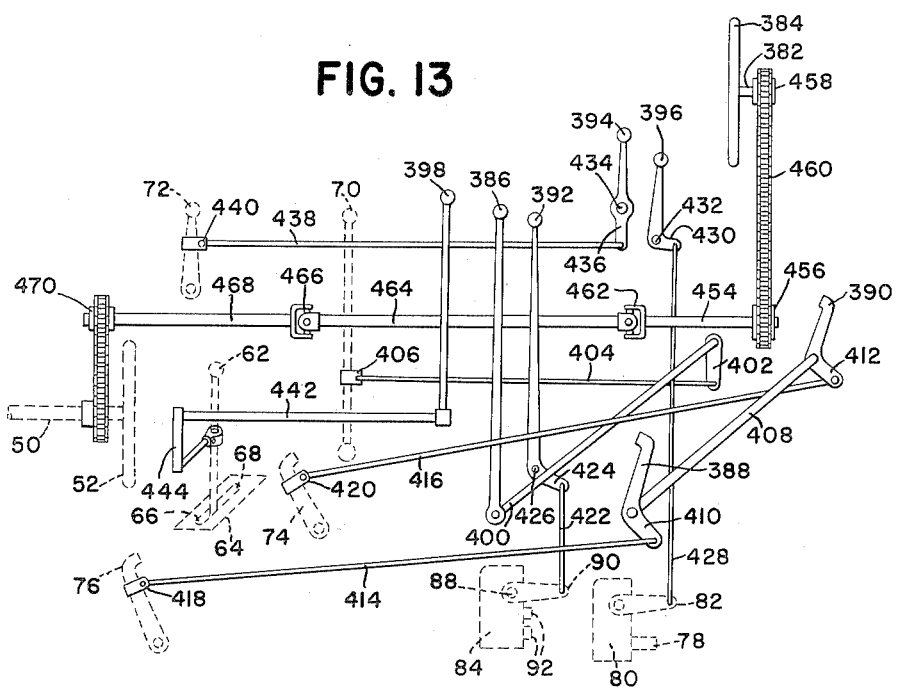

United States Patent Office 2,719,394
Patented Oct. 4, 1955

2,719,394

TRACTOR-MOUNTABLE HARVESTER

Fred A. Thomann and Robert H. Meier, Des Moines, Iowa, assignors to Deere Manufacturing Co., Dubuque, Iowa, a corporation of Iowa Application July 8, 1954, Serial No. 441,982

27 Claims. (Cl. 56—14)

This invention relates to a harvester and more particularly to a harvester in the form of an attachment that may be readily mounted on and dismounted from a conventional agricultural tractor.

The invention aims primarily at the provision of an improved harvester, preferably a cotton picker, having several disconnected components that may be related in assembly on a conventional agricultural tractor to perform as a unitary self-propelled machine. Since the machine is especially designed for use with a conventional agricultural tractor of the type having a narrow fore-and-aft extending body carried at its front end on steerable wheels and at its rear end on traction wheels, the over-all cost of the machine is reduced, because it does not need a specially designed propelling vehicle such as is the case in the cotton picker forming the subject matter of the U. S. patent to Paradise 2,660,852. Although machines of that nature have pronounced advantages, particularly in multi-crop operation, many operators prefer to utilize an existing tractor and to mount an attachment thereon, thus reducing the capital investment required.

Although the idea of using a tractor as a basic power source for various types of implements is not new, and is not new even in the cotton picker art, as exemplified by the U. S. patent to Scarratt 2,352,291, former designs leave much to be desired in the way of utilizing the attachment with a minimum of conversion or "rebuilding" of the basic tractor. In the larger types of machines, such as cotton pickers, combines, etc., it is desirable to mount the machine on the tractor in such manner that the tractor is driven in a reverse direction, whereby its rearward end becomes its forward end and the steerable wheel means trails the traction wheels. An arrangement of this nature is advantageous from the standpoint of utilizing the traction wheels to support the relatively great weight of the attachment and is further beneficial from the standpoint of enabling location of the operator at a vantage point substantially immediately above the harvesting unit so that he can better observe the operation of the machine. Here again, the basic idea of so locating the operator is not new, but many problems in this respect are presented in the adaptation of a conventional tractor as the basic power source.

According to the present invention, the basic tractor is not altered and the attachment itself is equipped with drive elements, control elements, and supporting structure that adapt themselves to existing structure on the tractor. It is an object of the invention to provide the attachment in the form of a main frame that embraces the tractor from one end, so that the tractor can be driven into and out of the frame structure for mounting and dismounting. It is another object of the invention to utilize the main frame structure as means for carrying the harvesting unit itself, thus eliminating the need for special mounting brackets on the tractor. The inventive structure here disclosed features also the utilization of auxiliary operator's station structure that does not disturb the existing tractor structure, leaving intact the existing tractor steering wheel and tractor seat so that if desired the tractor may be driven from either of the two seats. Further objects of the invention reside in the provision of novel means for powering the harvester from the tractor power plant, for vertically adjusting the harvester from existing power lift means on the tractor, and improved means for mounting and dismounting the several components of the attachment.

The foregoing and other important objects and desirable features inherent in and encompassed by the invention will become apparent as a preferred embodiment of the invention is disclosed in detail in the following detailed specification and accompanying sheets of drawings, the several figures of which will be described immediately below.

Fig. 1 is a perspective view of the assembled machine.

Fig. 2 is an enlarged perspective fragmentary view of part of the adjusting means as seen generally in the direction of the arrow bearing the encircled numeral 2 in Fig. 1.

Fig. 3 is a perspective view, on a scale somewhat enlarged over that of Fig. 1, and illustrating one stage of the mounting or dismounting of the picking unit on the front end of the machine.

Fig. 4 is a front perspective view of the assembled machine.

Fig. 5 is a fragmentary perspective view, on a somewhat enlarged scale, illustrating the mounting of the auxiliary operator's station on the front of the machine.

Fig. 6 is a schematic elevational view, on a reduced scale, showing the several components involved in the assembly of the machine.

Fig. 7 is a perspective view, on a scale somewhat larger than that of Fig. 1, showing the dismounted main frame and receptacle supported thereby.

Fig. 11 is an enlarged elevational view with parts broken away and shown in section showing the mounting of the forward end portion of one of the side members of the main frame.

Fig. 12 is a sectional view as seen along the line 12—12 of Fig. 11.

Fig. 13 is a schematic illustration showing the connection of the harvester or auxiliary controls to the tractor controls, the latter being shown in broken lines for the purposes of convenience and clarity.

Fig. 14 is a fragmentary view with parts broken away and shown in section, as seen generally in the direction of the arrow bearing the encircled numeral 14 in Fig. 1.

Fig. 15 is a fragmentary elevational view on the scale of Fig. 1 with parts broken away and shown in section and showing the stabilizing means for the picking unit.

Fig. 16 is a fragmentary perspective view on an enlarged scale and showing part of the drive means for the harvester pneumatic conveyor.

Fig. 17 is a fragmentary perspective view on an enlarged scale and showing part of the drive to the picking unit.

Fig. 18 is a fragmentary bottom plan view of the conveying fan, illustrating the drive therefor.

In general

Figures 8, 9, 10:
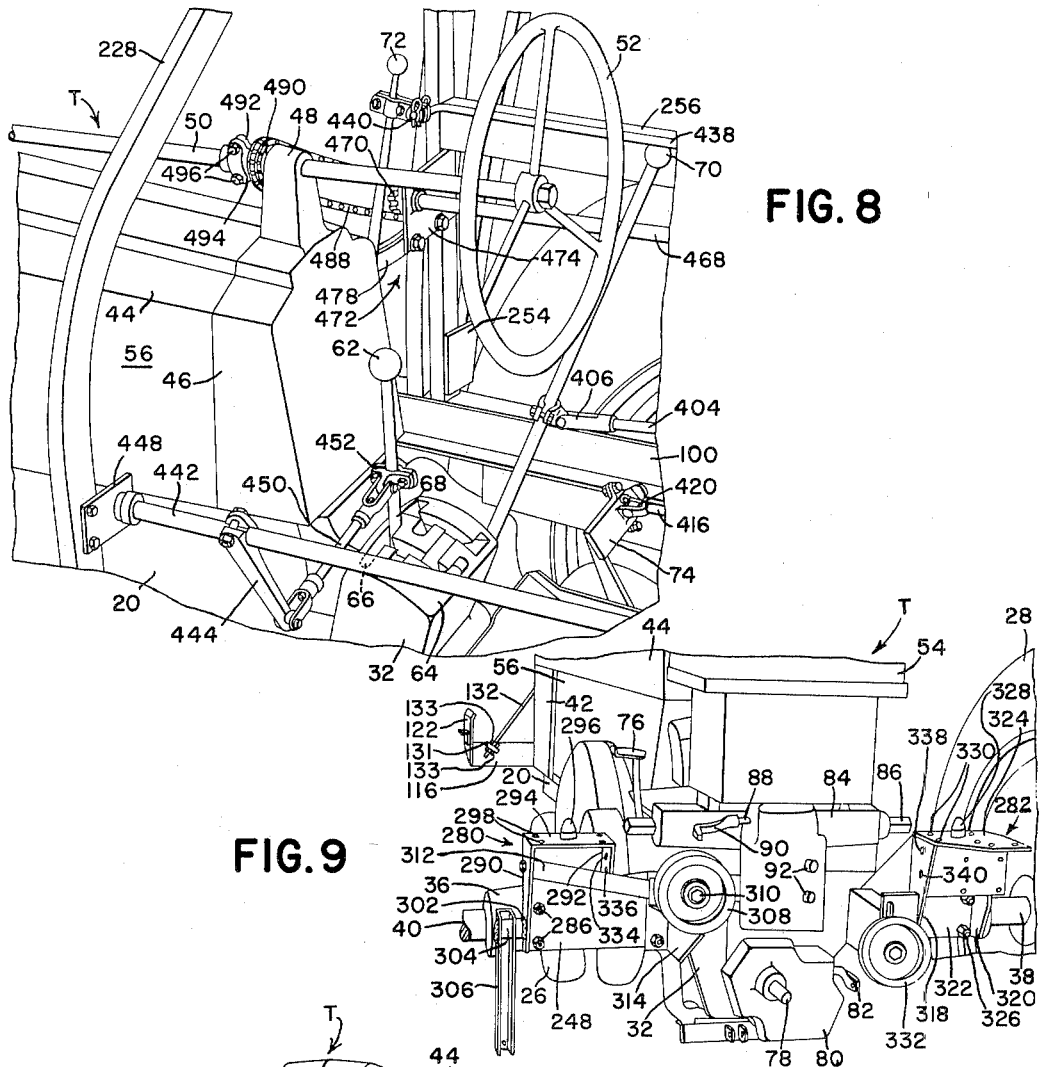
Fig. 8 is a fragmentary perspective view, on an enlarged scale, as seen generally in the direction of the arrow bearing the encircled numeral 8 in Fig. 1.
Fig. 9 is a fragmentary perspective view, on approximately the scale of Fig. 3, showing the tractor structure as seen in the direction of the arrow bearing the encircled numeral 9 in Fig. 5.
Fig. 10 is a fragmentary perspective view, on a scale somewhat enlarged over that of Fig. 1, as seen generally in the direction of the arrow bearing the encircled numeral 10 in Fig. 1.

The machine is made up of the several basic components best illustrated in Fig. 6, to which reference will be had first for a brief description of these components and the broad relationship therebetween. As shown in that figure, the basic power source comprises a tractor T, which will be recognized as a popular type of agricultural tractor as shown, for example, in the U. S. patents to McCormick 2,304,365 and Nordenson 2,601,553. Additionally involved in the harvester attachment itself, which is here shown as a cotton picker, are a main frame M, on which is supported a basket or receptacle B, an auxiliary operator's station O and a cotton-picking unit P. When these components are assembled, they produce the complete machine as shown best in Figs. 1 and 4.

Tractor

As indicated above, the tractor illustrated is or may be of the type shown in the McCormick and Nordenson patents and, although illustrated as being of the so-called tricycle type, could as well be of a different nature. As seen, the tractor comprises a longitudinal or fore-and-aft narrow body 20 having front and rear ends 22 and 24, respectively, supported on a front steerable wheel 26 and right- and left-hand rear traction wheels 28 and 30. The steerable wheel shown here happens to be of the dual-truck type; although, it is known to use but a single wheel, the two being the full equivalents of each other in most instances. As already suggested, a wide axle having a pair of laterally spaced wheels could as well be used. The particular nature of the front wheel construction is immaterial and further reference herein will be to "wheel" in the singular, it being understood that the expression has, of course, a broader significance.

The traction wheels 28 and 30 are connected to a transmission casing 32, which forms the rear part of the body 20, by means of right- and left-hand laterally outwardly extending axle housing 34 and 36 (Fig. 9), these housings respectively journaling drive axles 38 and 40 for the wheels 28 and 30, an arrangement that is typically shown in the U. S. patent to Nordenson 2,568,928.

The power plant may be conventionally enclosed at its forward end by an upright radiator grille 42 from which an engine hood 44 extends rearwardly to comprise part of upright means rising from the body and terminating in a rear casting 46 that serves not only as an instrument panel but also as means providing a bearing 48 on a fore-and-aft extending axis for journaling a steering wheel shaft 50. This shaft is connected in any conventional manner (not shown here) at its front end to the steerable wheel 26 and has fixed to its rear end a steering wheel 52 just behind the upright structure 46 and ahead of an operator's seat 54.

In the completed or assembled machine, the engine or power plant, designated by the numeral 56 in Fig. 6, will be enclosed by opposite side sheets, only one of which is visible at 57, and thus the engine will be enclosed between the radiator grille 42 and the rear upright casting or instrument panel 46.

As is typical of the particular tractor illustrated, the radiator grille is divided by an upright casting 58 that rises from and is rigidly joined to a transverse lower casting 60 that in turn forms a forward part of the body 20. The casting 58, as well as the lower casting 60, is used in mounting of the harvester unit, as will appear later.

The tractor shown is of the type having its transmission arranged with the transmission and countershafts transverse to the longitudinal centerline of the body, as in the U. S. patents to McCormick 2,103,543 and Ross 2,660,892. This transmission is controlled by a tractor gear shift lever 62 that is movable laterally as well as fore and aft on the tractor through a guide plate 64 having therein a plurality of notches corresponding to the positions of the lever for different forward and reverse speeds. In the present case, concern is had with only a reverse speed and one forward speed. Accordingly, the only notches in the plate 64 that are designated by numerals here are the reverse notch at 66 and the first speed forward notch at 68, since these are the only two speeds used in normal operation of the assembled machine, although, the transmission is not altered in any way and the other notches or slots are available for driving of the tractor in its conventional forward direction, all of which will appear subsequently. The transmission of the character described is peculiar to a tractor of the type having its internal combustion engine of the two-cylinder type arranged with the pistons reciprocating horizontally fore and aft as distinguished from vertically, which details are shown in the McCormick patent, identified above, as well as in the U. S. patent to McCray 1,957,221. This transmission is under control of a clutch (not shown here, but illustrated in the above-identified McCormick patents). This clutch is of the type shifted by a lever as distinguished from a pedal, the lever here being designated by the numeral 70 and having a fore-and-aft range of movement to engage and disengage the clutch. Engine speed is regulated by a speed-control lever 72. Steering and braking of the tractor is accomplished by right- and left-hand brakes (not shown, because conventional) respectively under control of right- and left-hand brake pedals 74 and 76. As is well known, the brakes may be individually applied to assist steering of the tractor.

A tractor such as that shown will be conventionally equipped with a power take-off shaft, and such shaft is shown here at 78 as projecting rearwardly from a housing 80 secured to the rear of the transmission casing 32. As is conventional, the power take-off shaft 78 derives its power initially from the tractor engine 56 and is engaged and disengaged, selectively, by an internal clutch (not shown) under control of a shifter lever 82 (Figs. 9 and 13).

The tractor is also equipped with a power lift system, such as that forming the subject matter of the U. S. patent to Jirsa 2,532,552. Of importance here are only those parts comprising a power lift housing 84 mounted at the rear end of the transmission casing 32 and carrying a transverse rockshaft 86 (Figs. 6, 9 and 13). The rockshaft 86 is powered by an internal hydraulic cylinder (not shown) and is under control of an actuating shaft 88 to which is keyed a control arm 90 (Figs. 9 and 13). In addition to the internal hydraulic cylinder, the power lift system includes provision for supplying fluid under pressure to one or more remote cylinders, of momentary insignificance, which provision takes the form of a pair of capped hydraulic outlets 92 (also Figs. 9 and 13).

The tractor as just described is typical of those popular in the agricultural field and has all of the essential components, either as standard or optional equipment, such as the power lift system and power take-off shaft, for achieving normal operation of the tractor in connection with a variety of drawn and mounted implements, in which cases the tractor will be driven in its conventionally forward direction with the steerable wheel 26 ahead or leading and the traction wheels 28 and 30 at the rear or trailing. As will be brought out below, the use of the tractor in connection with the harvester attachment comprising the picker unit P, the auxiliary operator's station O and the main frame M and basket B, requires that the tractor be unconventionally driven in a rear direction so that what was formerly its front end now becomes its rear end, which involves also the fact that what were formerly right-hand parts now become left-hand parts, it being apparent from Fig. 6 that the auxiliary operator's station faces in a direction to the rear or opposite to the forward direction in which the tractor seat 54 faces. Despite the change, normal operation of the tractor is still available, since none of its controls is altered and there are no changes made in its basic structure, the tractor simply using the reverse gear of its standard transmission for operation in the opposite direction to form the basic propelling unit of the assembled harvester.

Main frame and basket

Because of the change in direction of the tractor when used with the harvester attachment, the main frame has basic front and rear ends which are just the opposite of the conventional front and rear ends of the tractor. However, in the interests of avoiding confusion, reference hereinafter to "front" and "rear" will be to the parts of the assembled machine as it operates normally and reference to the former front end of the tractor will be to its "steerable-wheel-supported end" and the former rear end will be termed the "traction-wheel-supported end."

The main frame M is of elongated fore-and-aft configuration, constructed to embrace the tractor at its steerable-wheel-supported end 22 and for that reason the main frame has a pair of parallel side frame members 100 and 102 respectively having front ends 104 and 106 and rear ends 108 and 110. The side members are cross-connected at their rear ends by a rigid transverse or cross member 112, thus achieving unitary construction and rigidity of the frame M. At this point, it is well to note that the cross member 112 is the only member that cross-connects the side members 100 and 102, thus giving the main frame M its closed rear end and open front end, whereby the frame may be moved longitudinally relative to the tractor for mounting and dismounting thereof.

The side members 100 and 102 extend forwardly at a level above and project beyond the axle housings 34 and 36 at the traction-wheel-supported end of the tractor T, and these side members are individually supported on the axle housing by means to be presently described. The rear end portion of the frame M has tractor-engaging structure, designated generally by the numeral 114, comprising a transverse channel member 116 secured by studs 118 to the lower casting 60 at the steerable-wheel-supported end of the tractor. This member has at its opposite ends upstanding triangular plates 120 and 122 detachably connected respectively to member-carried plates 124 and 126, respectively on the side members 100 and 102, by bolts 128 and 130, respectively. The member 116 is braced to the upright casting 58 by a pair of diagonal braces 132 and has a pair of spaced apertured lugs 131 through which the lower threaded ends of the braces 132 pass to receive nuts 133 (Fig. 9). These nuts may be adjusted to level the member 116 and consequently to level the main frame M. In the mounting and dismounting of the assembled harvester on and from the tractor, it is preferred that the transverse member 116, together with its end plates 120 and 122 and its braces 132, remain on the tractor, so that the main frame may assume the dismounted position suggested in Fig. 7. The upright casting 58 is conventionally provided with tapped bores (not shown) for receiving cap screws 134 to connect the upper ends of the braces 132. Hence, it is not necessary to alter the tractor; although, in other tractors it may be required that special attaching points be provided.

As stated above, the front end portions 104 and 106 of the side frame members 100 and 102 project respectively forwardly beyond the axle housings 34 and 36 of the tractor T. The front portion 106 of the side member 102 carries thereon supporting structure in the form of a depending shoe member 136 having an upwardly and forwardly inclined ramp 138. The shoe member 136 is preferably of box section and has an under portion 140 provided with an aperture 142 for purposes to be presently described in connection with the front tractor-engaging structure. For the present, let it be assumed that the side frame member 102 is simply supported on the proximate axle housing 36. The shoe is secured to the frame member 102, as by welding, and thus may be considered a rigid part thereof. In addition, the shoe has opposite fore-and-aft extending angles 144 and 146, welded to the shoe, as at 148 and 150, and respectively having horizontal flanges 152 and 154 that are coplanar with the under portion 140 of the shoe, thus affording on the shoe a relatively broad flat surface for mounting on the axle housing by the front mounting structure that will be described below. Additionally, the top edge of the forward portion of the member 102 has thereon a mounting member 156, which is provided with an apertured ear 158. This member is used in the mounting of the operator's station, the description of which will appear below. The member 156 is rigid on the member 102, welding being utilized, as at 160 and 162, as representative of one form of means for uniting the two. The flanges 152 and 154 on the angles 144 and 146 are apertured respectively at 164 and 166.

The forward portion 104 of the other side member 100 is similarly equipped with parts corresponding to those just described in connection with the forward part of the other side member 102. For example, visible in Fig. 7 is a shoe 168 having a ramp 170 and provided with angles having attaching flanges or ears 172 and 174, the other details being the same as on the shoe 136 and therefore requiring no additional description.

The forward portions of the side frame members 100 and 102 are provided respectively with rockshaft carriers designated generally by the numerals 176 and 178. These carriers are coaxial or transversely alined and respectively comprise detachable parts that facilitate mounting and dismounting of the picking unit P. As representative of one form of construction, the rockshaft carrier 176 is shown as comprising a first bearing half 180 rigid on the forward part 104 of the frame member 100 and complemented by a complementary or second bearing half 182 that is removably secured to the first bearing half 180 as by removable cap screws 184. Similar construction is provided for the front end 106 of the other side member 102, and the other carrier 178 therefore comprises first and second complementary bearing halves 186 and 188 and removable securing means in the form of cap screws 190. Fig. 11 illustrates that the first bearing half 186 for the member 102 may be welded to the member 102 as at 192. This figure likewise shows the member 186 as having a pair of tapped bores 194 therein for receiving the cap screws 190. The details illustrated here may be considered as being duplicated for the rockshaft carrier 178 and it is deemed unnecessary to repeat them. The forward part of the shoe 136 carries an apertured mounting lug 196 for the purpose of mounting a shield, the details of which will be described later. A similar apertured mounting lug 198 is carried by the other shoe 168.

A still further part of the forward end of the frame member 102 is a rectangular loop 200 welded to the member 102 and projecting laterally to one side thereof (shown broken away in Fig. 11). This loop has an apertured transverse upper portion 202 to which is welded a threaded collar 204, and a screw member 206 is threaded through the collar 204 and aperture 202 to project below the apertured portion as one of a pair of stops, the other one of which will be described in connection with the mounting of the picking unit P.

The receptacle or basket B has front and rear ends made up respectively by front and rear trapezoidal end frames 208 and 210, and the end frames are joined by rectangular side frames 212 and 214, the basket being completed by a floor frame 216 and a trussed cover 218. The various frames are closed by appropriate wire mesh, as at 220, with the exception of portions 222 of the cover 218 and with the further exception of the side frame 214. The cover or top 218 is hinged to the side frame 212 along a fore-and-aft extending axis as by the pivot indicated at 224, the cover being thus adapted to open as the basket as a whole tilts to one side about a longitudinal pivot pipe 226 carried at opposite ends respectively by front and rear upright support frames 228 and 230, the lower ends of these frames being rigidly secured to the main frame side members 100 and 102.

The basket B is tiltable to the left-hand side of the machine (to the right, as viewed in Fig. 4) by means of power supplied by front and rear hydraulic cylinders 232 and 234. The front cylinder 232 has a piston rod, the top end of which is visible at 236 in Figs. 1 and 4, and the top end of this piston rod is connected to a lift arm 238 that is fixed to the forward end of the tilt pipe 226. A similar lift arm 240 is fixed to the rear end of the tilt pipe 226 and is connected to a piston rod 242 for the rear cylinder 234. A portion of the piston rod 242 is visible in Fig. 1. Hence, as the cylinders 232 and 234 extend, the lift arms 238 and 240 are swung in a clockwise direction, as viewed in Fig. 4, tilting the basket B in the same direction. Opening of the cover 218 about the pivot axis 224 at the opposite side of the basket is accomplished automatically by means of front and rear control links 244 and 246, which links are connected respectively to triangular front and rear arms 248 and 250 which are in turn connected respectively to front and rear ends of the cover 218. The details of this structure are without substantial significance here and the parts have been described merely because they are illustrated. They neither add to nor detract from the scope of the present invention. Hydraulic fluid for operating the cylinders 232 and 234 may be obtained from the power lift system of the tractor, by means of the connection of a suitable hose (not shown) to one of the hydraulic outlets 92, previously described. These details, as those above, are immaterial, except for the fact that a connection at 92 would be by means of a quick-detachable coupling such as shown in the above-identified Jirsa patent, which is an expedient contributing here to the facility with which the harvester may be mounted on and dismounted from the tractor but apart from that it forms no part of the present invention.

It is important to note that the front and rear basket supports 228 and 230 support the basket in such position that the floor 216 thereof is at a level above the level of the tractor hood 44. Therefore, when the main frame and basket as a unit is mounted on the tractor, there is no interference between the basket floor and the tractor hood. The tractor would normally have an upright exhaust pipe, but this is removed and is enclosed in a horizontal shield 252 which may be mounted independently on the tractor or may be carried as part of the basket floor 216. The purpose of the shield is obvious: The exhaust cannot be directed into the basket, because of its effect on the cotton. Moreover, the shield is necessary to prevent combustion of the basket-carried cotton. This is but the single alteration necessary in the basic tractor structure but it may be simply and economically effected and is not considered as a material alteration.

In addition to the upright basket supports 228 and 230, the main frame carries, rigidly secured to and rising from a forward part of the side frame member 100, a plurality of upright supports 254, on the upper ends of which is carried a horizontal frame 256 for supporting a pneumatic fan means 258. This fan has a pair of inlets 260 and 262, one at each side, and a single outlet or discharge duct 264. The upper end of the duct 264 delivers through an opening 266 in the front portion of the basket cover 218. As will presently appear, the inlets 260 and 262 of the fan 258 are connected to the picking unit P and effect the transfer of cotton from the picking unit to the basket B. Behind the fan 258 is a tank 268 which contains water or a suitable wetting agent conventionally used in increasing the efficiency of the picking parts of the picking unit P.

The relationship between the fan discharge duct 264 and the basket cover inlet or opening 266 is such that the fan discharge duct remains with the main frame when the basket tilts, and there is no interference between the discharge end of the duct 264 and the portions of the basket cover that define the opening 266, all of which is generally conventional and imposes no limitations on the present invention.

The various components of the frame sections of the basket and of the supporting structure are adequately interconnected and, in the interests of brevity and clarity, the connections have been omitted, since they may be of any particular type not affecting the present disclosure one way or the other. Of some significance, however, is the bracing of the front basket support 228 to the side frame member 102 by a triangular brace 270 which forms an anchor point for a longitudinally extending counterbalance or assist spring 272, the other end of which is appropriately connected to the picking unit in a manner to appear below. The spring 272 may be considered part of the main frame or part of the picking unit, which is virtually without significance except that in either event the arrangement is such that the spring is not connected to the tractor but is part of one component or the other of the harvester attachment.

*Front tractor-engaging structure*

The front tractor-engaging structure for mounting the front ends 104 and 106 of the main frame side members 100 and 102 comprises a pair of individual mounting means in the form of brackets designated generally by the numerals 280 and 282 respectively. These combine with the main-frame-carried shoes 136 and 168 to achieve the tractor-engaging or mounting structure.

The axle-engaging bracket 280 comprises an upright element or flange 284 apertured to receive cap screws 286 that are threaded into cooperating tapped bores 288 provided in the axle housing 36, as shown in the above-identified Nordenson Patent 2,568,928. Apertures or equivalent mounting means of this character are conventional equipment on most if not all tractors. The cap screws 286, when tightened, rigidly mount the axle housing bracket 280 securely in place and the bracket becomes for all intents and purposes a rigid part of the axle housing. In addition to the upright transverse flange or web 284, the bracket 280 has a pair of upright fore-and-aft extending webs or flanges 290 and 292, the tops of which are cross-connected by an upper horizontal plate 294 from which rises an upright locating pin or stud 296 receivable by the aperture 142 in the associated side member shoe 136 (Fig. 11). The plate 294 is provided with a plurality of apertures 298 which register with the apertures 164 and 166 in the shoe-carried flanges 152 and 154. Releasable securing means, such as bolts 300, are passed through the registered apertures to secure the associated frame member to the axle bracket 280.

The outer web 290 of the axle bracket 280 has rigidly secured thereto, as by welding at 302, a torsion shaft 304 to which is welded a depending stabilizer arm 306, the lower end of which is connected to the picking unit P, in a manner to be hereinafter described. The axle bracket 280 additionally carries an idler sheave 308 by means of a fore-and-aft extending stub shaft 310 appropriately supported by a brace 312 and a third fore-and-aft extending web 314 that is part of the axle bracket 280. The sheave 308 is in transverse alinement with a power take-off sheave 316 secured to the power take-off shaft 78 (Fig. 5).

The other axle bracket 282 is similarly constructed, and to that extent has inner and outer web elements 318 and 320 joined by a transverse upright web 322 and a top plate 324. The axle bracket web 322 is secured to the tractor axle housing 34 by cap screws 326 corresponding to the cap screws 286 for the other axle bracket 280. Rising from the top plate 324 is a locating pin or stud 328 that corresponds to the stud 296 at the other side of the mounting structure. The top plate 324 is apertured at 330 to receive securing means (not shown) corresponding to those shown at 300 at the other side of the structure, which securing means mounts the shoe 168 and its appurtenant flanges 172 and 174 (Fig. 7), it being understood that the shoe 168 has an under portion apertured to receive the stud 328. An idler sheave 332 is appropriately journaled on the axle bracket 282, the details of the mounting being very similar to those for the sheave 308 and therefore requiring no repetition.

The axle brackets 280 and 282, in addition to supporting the front ends of the main frame M, provide means for mounting the operator's station O. To this end, the inner fore-and-aft extending web 292 of the axle bracket 280 has upper and lower apertures 334 and 336 therein. The web 318 of the other axle bracket has upper and lower apertures 338 and 340. The upper apertures 334 and 338 are in transverse alinement, and the lower apertures are also in transverse alinement on a parallel axis. The use of these apertures as mounting elements for the operator's station will be apparent in the ensuing description.

*Auxiliary or harvester operator's station*

This station structure, previously identified generally by the letter O, comprises a horizontal fore-and-aft extending platform 350 to the rear end of which is rigidly affixed depending leg or supporting structure 352 comprising a pair of upright supports 354 and 356. The support or leg 354 has an apertured lower end portion 358, the aperture of which is registrable with the lower aperture 336 in the web 292 of the axle bracket 280, and the registered apertures receive connecting means, such as a bolt and nut 360, which connection provides a pivot on a transverse axis. The other leg 356 has an apertured lower end portion 362, the aperture of which is registrable with the lower aperture 340 in the axle bracket 282, the alined apertures receiving a pivotal connection in the form of a bolt 364 that is coaxial with the pivot bolt 360.

In addition to the aperture at the lower end portion 358, the leg 354 has a pair of vertically spaced apertures 366 and 368 in higher portions thereof. Higher portions of the leg 356 are similarly apertured at 370 and 372. In the premounted (or predismounted) position of the operator's station O as seen in Fig. 5, the lower portions 358 and 362 of the legs 354 and 356 are carried on the coaxial mounting and pivot bolts 360 and 364. Assuming that mounting of the operator's station is being accomplished, it will be seen that all that is necessary to complete the mounting is to swing the station structure upwardly. When this occurs, the apertures 366 and 370 become alined respectively with the axle bracket apertures 334 and 338, and additional removable securing means are passed through the respective pairs of registering apertures. Fig. 12 illustrates the construction for mounting the operator's station structure leg 354 and a description of this leg and its mounting will serve for the other side of the structure. As seen in that figure, the lower end portion 358 of the leg 354 is mounted on the web 292 of the axle bracket 280 by means of the pivot bolt 360. A second bolt 374 is shown as passing through the registered apertures 334 and 366. In the mounted position of the seat, the uppermost aperture 368 in the leg 354 will become alined with the apertured ear 158 on the supporting bracket 156, previously described as being carried by the front portion of the side member 102 of the main frame M. A third securing means in the form of a bolt 376 is passed through this pair of alined apertures and the station structure is thus rigidly mounted. As already stated, the structure is duplicated at the other side and a detailed description thereof would be only repetitious of what has already occurred.

The operator's station structure O has mounted on its platform 350 a forwardly facing seat 378 which, because of the direction in which it faces, is opposed to the tractor seat 54. That is to say, the auxiliary seat 378 faces in the direction of normal travel of the machine when operating as a harvester, whereas the seat 54 remains in position as facing the front end of the tractor when the tractor is operated by itself or as a draft vehicle or in other conventional circumstances. Stated otherwise, the assembled machine has two seats, one at 54 and one at 378, and an operator may seat himself on either of them to operate the machine. During normal operation he will, of course, mount the platform 350 and either stand on the platform or sit on the seat 378. But there may be occasions when he will desire to drive the machine in its former forward direction from the seat 54 and, since none of the tractor controls is removed, these will all be available for his use on such occasions.

Forwardly of the harvester or auxiliary seat 378 is a support in the form of a standard 380, at the upper end of which is journaled a longitudinally extending, relatively short auxiliary steering shaft 382 to which is keyed in any appropriate manner an auxiliary steering wheel 384. The steering wheel 384 is arranged conveniently to the seat 378, as are a plurality of other auxiliary controls such as an auxiliary clutch-control lever 386, auxiliary brake pedals 388 and 390, an auxiliary power lift control lever 392, an auxiliary speed-control lever 394 and a power take-off control lever 396. In addition to these, the platform 350 carries an auxiliary gear shift lever 398. These controls are all arranged consonant with the direction of travel of the assembled machine and the position of the auxiliary control lever 386 is such that it is at the side of the machine opposite to the tractor clutch lever 70. This is accomplished by mounting on the platform 350 a transverse rockshaft 400 (Fig. 13) and fixing the lower end of the auxiliary clutch lever 386 thereto. The other end of the rockshaft 400 has fixed thereto a depending arm 402 and motion is transmitted from the auxiliary clutch lever 386 and rockshaft 400 by means of the arm 402 and a fore-and-aft extending link 404, the forward end of which is detachably connected at 406 to the tractor clutch lever 70.

The brake pedals 388 and 390 are journaled on a transverse shaft 408 and respectively have depending arm portions 410 and 412 connected by fore-and-aft extending links 414 and 416 respectively to the tractor brake pedals 74 and 76. Detachable connections are used respectively at 418 and 420, the details of which are unimportant, since any type of connection may be used.

The control lever 90 for the power lift system contained in the housing 84 (which controls the power lift rockshaft 86) is connected by an upright link 422 to a lower arm portion 424 of the auxiliary power lift control lever 392, this lever being fulcrumed at 426 intermediate its ends. The power take-off shaft clutch (not shown), previously described as being controlled by the power take-off clutch lever 82, is controlled by the auxiliary power take-off control lever 396 by means of a link 428 that extends between the tractor lever or arm 82 and an arm portion 430 on the auxiliary power take-off control lever 396, which lever is fulcrumed intermediate its ends at 432.

The auxiliary speed-control lever 394 is fulcrumed intermediate its ends at 434 in any suitable manner as on the side of the auxiliary seat 378 (Fig. 4) and has a depending arm portion 436 connected by a fore-and-aft extending link 438 to the tractor speed-control lever 72, again a quickly detachable connection being used at 400. The connections of the power lift and power take-off shaft control links to their respective levers 90 and 82 are also quickly detachable.

The auxiliary gear shift or transmission control lever 398 is mounted on the platform 350 by means of a fore-and-aft extending rockshaft 442 to the forward end of which the lower end of the lever 398 is secured and to the rear end of which is secured a depending arm 444. The front end of the rockshaft 442 is mounted in a bearing bracket 446 that is secured to one side of the platform 350. The rear end of the rockshaft 442 is journaled in a bearing bracket 448 mounted on the front basket support 228 of the main frame M (Fig. 7). The arm 444 is connected by means in the form of a transverse link 450 to the tractor gear shift lever 62. As the auxiliary gear shift lever 398 is rocked from right to left, the forces transmitted thereby cause right to left rocking of the gear shift lever 62, therefore shifting the tractor transmission between first and reverse speeds. In other words, the other speeds of the tractor transmission are not used and the shift lever 62 is shiftable only between the reverse notch 66 and the first speed notch 68. However, the connection of the link 450 to the lever 62 is conveniently disconnectible, as at 452, so that disconnection is a simple matter and the other transmission speeds of the tractor are readily available in the event that it is desired to drive the machine from the tractor seat 54.

The auxiliary platform 350 journals at a forward lower portion thereof a short driving shaft 454 to which is keyed a sprocket 456. The shaft 382 for the steering wheel 384 has a sprocket 458 secured thereto for rotation therewith and a driving chain 460 is trained about the two sprockets 456 and 458, the drive thus established being enclosed in the standard 380. The shaft 454 extends rearwardly and is connected by a universal joint 462 to an intermediate shaft 464 which is in turn connected by a universal joint 466 to a steering output shaft 468. Any appropriate journals (not shown) may be provided on the platform for the shafts 454, 464 and 468. The extreme rear end of the shaft 468 terminates in a driving sprocket 470 which lies ahead of the tractor steering wheel 52 and in laterally offset relationship to the tractor steering shaft 50. The front end of the shaft 468 is carried by adjustable supporting structure, designated generally by the numeral 472. This structure includes a mounting plate 474 that is slotted at 475 and secured to the front basket support 228 as by bolts 476 (Fig. 14). An adjustable brace element 478 is secured at one end to the plate 474 by bolts 480, the brace being slotted at 482 to permit adjustment thereof relative to the plate. At its other end, the brace 478 carries a cam device 484 rockable about a pivot bolt 486 on the brace. The cam device 484 bears against that part of the upright tractor structure comprising the rear casting or instrument panel 46. A driving chain 488 is trained about the sprocket 470 and about a split sprocket 490 that is mounted on the tractor steering shaft ahead of the bearing 48. The structure of the rotary member comprising the sprocket 490 is clearly shown in Fig. 8 as comprising a pair of complementary halves 492 and 494 removably secured together in shaft-embracing relationship by bolts 496. The cam device, bearing against the casting 46, may be rotated about its pivot 486 and then locked after its adjusted position is obtained, for the purpose of adjusting the tension in the chain 488. The slots 482 in the brace 478 permit adjustment of the brace 478 in a lateral direction so as to obtain the maximum benefit from the cam device 484.

As will be seen, it is a characteristic of all of the controls that are mounted on the auxiliary station structure that they are connectible respectively to the tractor controls by means involving no material alterations in the tractor controls. All of the connections are readily connectible and disconnectible, all of which facilitates the mounting and dismounting of the station structure.

*Picking unit and mounting therefor*

The machine here is of the row-crop type, which is to say that it operates over a field in which the crops are planted in parallel rows. In the present case, the machine operates with the traction wheels 28 and 30 astride a pair of adjacent rows and with the steerable wheel 26 between that pair of rows. The picking unit P is therefore offset laterally to one side of the fore-and-aft centerline of the machine to pick from the row more closely adjacent to the traction wheel 30. The picking unit is a single-row unit like one of the row units in the above-noted patent to Paradise; although, the interior details of the mechanism are not important. Suffice it to say that the picking unit includes a housing 510 having top structure 512 on which are integrally mounted two laterally spaced apart upright apertured mounting elements or lugs 514 and 516. To these lugs are pivoted the forward ends of a pair of rearwardly extending lift arms 518 and 520, and the rear ends of the lift arms are rigidly affixed to a transverse rockshaft 522. Opposite end portions of the rockshaft 522 are carried respectively in the rockshaft carriers or split bearings 176 and 178 at the forward ends of the main frame side members 100 and 102. The manner of mounting the rockshaft will be clear from Figs. 2 and 3. The rockshaft 522 is therefore parallel to the power lift rockshaft 86 and the power lift rockshaft is connected to the picker rockshaft to accomplish vertical adjustment of the picker unit. For the purposes of effecting this connection, the rockshaft 522 has adjacent one end thereof an upstanding arm 524 which is connectible to and disconnectible from the power lift rockshaft 86 by means of a link 526 and a power arm 528 that is fixed to the power lift rockshaft 86.

At its other end, the rockshaft 522 has an upstanding arm 530 fixed thereto and this arm is connected to the forward end of the balance or assist spring 272. Vertical adjustment of the picking unit P is under control of the operator by means of the power lift control lever 392, which regulates the angular movement of the power lift rockshaft 86. The picker unit is stabilized for vertical movement by means of a stabilizing link 532 connected between a lower portion of the picker unit housing 510 and the depending stabilizer arm 306 (Fig. 15).

The rockshaft 522 has additionally secured thereto a rearwardly extending stop arm 534 which projects into the loop 200 at the forward end of the main frame side member 102. The stop arm 534 can move within a limited vertical range inside the loop 200 and is engageable by the lower end of the adjustable screw 206, the position of which can be varied to establish a limit on the upward movement of the arm 534, which correspondingly establishes a limit on downward movement of the picking unit P. When the screw is screwed downwardly to its maximum extent, it will serve as means for positively locking the picking unit in an elevated position, which may be desirable from the standpoint of transporting the machine, in the case of repair or on any other occasion in which it is desirable to relieve the power lift rockshaft 86 of the weight of the picker.

The forward portion of the picker housing 510 is provided with a pair of laterally spaced divider points 536 which between them define an entrance for a picker throat 538, thereby enabling the picking unit to operate on plants in one row. A wheel shield 540 extends rearwardly from one side of the picker unit P and lies closely alongside a forward portion of the traction wheel 30. In order to prevent damage to plants in the other row, the machine has a plant shield 542 which is mounted on the main frame by the previously described shield-mounting lug 198 at the forward end of the main frame member 100 (Fig. 7). A similar shield (not shown) may be mounted under the axle housing 36 directly behind the picker unit P, the other shield-mounting lug 196 being used for that purpose.

As indicated above, the picking mechanism (not shown) contained in the picker housing 510 is of the type shown in the above-noted Paradise patent. A characteristic of mechanism of the type referred to is that the picked cotton is removed from the picking mechanism by doffing mechanism and is ultimately delivered to a receptacle such as the basket B in this case. For this purpose, the pneumatic conveying system, including the fan 258, has its inlets 260 and 262 connected respectively to conveying conduits 544 and 546 which lead to the doffing compartments (not shown) in the picker housing 510. The design of the machine is such that the conduits may remain with the picker unit when the picker unit is dismounted. For this reason, the connections of the conduits 544 and 546 to the fan inlets 260 and 262 are made readily detachable, which may be accomplished in any manner; therefore, the details are not illustrated or described. A combined guard and guide rail 547 is secured to the fan frame 256 and protects the conduit 546, serving as well as a guide to assist the operator in gauging the position of the machine relative to other vehicles, buildings, etc.

In Fig. 3 it will appear that the level of the rockshaft 522 is below the level of the top of the shield or tunnel 542. However, since the rockshaft 522 and its arms 518 and 520 are rigidly interconnected, they are pivoted as a unit to the top of the picker housing 510 at the lugs 514 and 516. Hence, this rockshaft and arm unit may be readily lifted manually to clear the shield 542 for connection to the rockshaft carriers 176 and 178.

The picking mechanism in the picking unit is driven by gearing (not shown) contained in a gear housing 548. Power is supplied to the gear housing 548 by means of a flexible input shaft 550 which has at its rear end a disconnectible coupling 552 for connection to the tractor power take-off shaft in a manner to presently appear. The shaft 550 is normally shielded, as shown at 554 in Fig. 1.

Driving means

As previously described, the tractor power plant is the basic source of power for all of the drivable components of the machine. The power take-off shaft 78 of the tractor (Fig. 9) has the driving sheave 316 (Fig. 3) and this sheave is in transverse alinement with the idler sheaves 308 and 332 carried respectively by the axle brackets 280 and 282. A driven double sheave 560, comprising part of a first driving mechanism (Fig. 17), is appropriately keyed to a splined driven shaft 562 which is in turn journaled in a bearing 564 mounted in a carrier bracket 566. This bracket is supported on the forward end 106 of the main frame side member 102 and is thus carried by the main frame exclusive of the tractor. Parallel driving belts 568 are trained about the sheaves 316, 308 and 560 (Fig. 3). The sheave 308 is wide enough to accommodate the two belts and the sheave 316 has three grooves therein to accommodate another belt (not shown) which is trained about the driving sheave 316 and about a driven sheave 570 that is carried by a shaft 578 journaled in a gear housing 580 mounted on the axle bracket 282 (Fig. 16). The gearing in the housing drives a transverse shaft 582 to which is keyed a sheave 584. The housing 580, like the bearing housing 564, is mounted on the harvester exclusive of the tractor, being supported by the axle bracket 282 and provides second driving mechanism.

The driven shaft 562 constitutes power driving means for driving the picking mechanism. Since the forward end of the shaft 562 is splined, it is easily connectible to the coupling 552 on the picker input shaft 550. The sheave 584 at the other side of the machine constitutes power means for driving the impellers in the fan housing 258. In the bottom view of the fan housing, as shown in Fig. 18, it will be seen that the fan housing is bifurcated to provide a slot 586 which is traversed by a driven shaft 588, the fan housing thus having two compartments in which are mounted individual impellers 590 and 592. These impellers are keyed to the shaft 588 as is a sheave 594, which rotates in the slot 586. A drive belt 596 is trained about the sheave 592 and about the sheave 584.

Operation, mounting and dismounting

The completely assembled machine, comprising the tractor T, main frame and basket M and B, operator's station O and picking unit P (Fig. 1), operates efficiently as a unit, since the parts have been specially designed for use with each other and with the tractor. The cooperation of the main frame in supporting the other components of the harvester without modifying the tractor is an important feature that contributes materially to the usefulness as well as to the efficiency of the harvester. When the operator's station O is in place and the controls thereon are connected to those of the tractor, complete maneuverability of the machine is assured, since the basic tractor structure is not altered. The operator on the seat 378 has a vantage point from which he can observe the operation of the picking unit as the machine advances over the field, the picking unit, of course, leading the traction wheels 28 and 30 and the steerable wheel 26 trailing and serving as a rear guide wheel. When it is desired to dismount the harvester, which may be required in order that the tractor may be used elsewhere, the machine is first driven to a location in which it is convenient to store or "park" the dismounted components. The power lift mechanism is operated to lower the picker unit P to the ground or preferably on some support raised slightly above the ground. The lift connection at 526 is then disconnected and the bearing caps 182 and 188 are removed from the rockshaft carriers 176 and 178. The lift spring 272 is disconnected and the tractor may be backed away from the parked picker unit, during which time the picker input shaft coupling 552 may be disconnected from the splined drive shaft 562. As indicated, the rockshaft and arm unit 522—518—520 will have to be lifted over the top edge of the tunnel shield 542, unless the shield is first removed.

The conduits 544 and 546 must of course be disconnected from the fan inlets 260 and 262.

The tractor, which now carries only the main frame, basket and operator's station, will be moved to a position clear of the picker unit so that the operator's station O can be removed. This is accomplished as suggested in Fig. 5, involving first the disconnection of the controls so that all the connecting links remain with the operator's station. Separation of the station supports 354 and 356 is made by reversing the procedure described in connection with Figs. 5, 11 and 12. After the station structure has been pivoted downwardly so that its front end is supported on the ground, it is a simple matter to remove the final pivot bolts 360 and 364, after which the tractor, carrying only the main frame and basket, may be operated by a driver on the tractor seat 54.

At a location far enough removed from the parked picker unit P and parked operator's station O, sufficient to allow the tractor to be driven out of the main frame and basket, removal of the basket and main frame may be accomplished. This requires first the disconnection of the conduits or adjusting connections between the tractor and the main frame and basket. The next step is to position some suitable supports, such as those shown as legs 598 and 600 in Fig. 7, under the front and rear ends of the main frame M. The supports shown in Fig. 7 are conveniently bolted or otherwise secured to the main frame and to the basket supports 228 and 230. The bolts 128 and 130 are removed between the main frame side members and the rear tractor-engaging structure 114, it being preferred that the transverse member 116 and its braces 132 and end plates 120 and 122 remain with the tractor, at least temporarily. The forward ends of the main frame are then released from the axle brackets 280 and 282, again it being preferred that the axle brackets remain with the tractor. It will be necessary to slightly elevate the forward end of the main frame to clear the shoes 136 and 168 from the locating pins or lugs 296 and 328. After this is done, and making sure that all belts, etc., are disconnected, the tractor may be driven in its conventionally reverse direction through the open end of the ground-supported main frame and basket, leaving the main frame and basket in the condition shown in Fig. 7.

Remounting of the harvester on the tractor is accomplished by reversing the procedure just described.

Summary

The several features and important objects of the invention have been outlined in connection with the description and need not be reiterated. Other features and advantages not categorically enumerated will undoubtedly occur to those versed in the art, as will various modifications and alterations in the preferred embodiment of the invention illustrated, all of which may be achieved without departing from the spirit and scope of the invention.

What is claimed is:

1. A harvester attachment for drive-in, drive-out mounting on and dismounting from an agricultural tractor of the type conventionally having opposite ends supported respectively on a steerable wheel and on widely spaced coaxial traction wheels journaled respectively on opposite transverse axle housings and unconventionally driven in a reverse direction so that the steerable-wheel-supported end of the tractor is the rear end and the traction-wheels-supported end is the front end, said attachment comprising: an elongated main frame having an open front end and a closed rear end constructed to embrace the tractor from its steerable-wheel-supported end and made up of transversely spaced apart fore-and-aft side frame members respectively having front and rear ends and a cross member rigidly cross-connecting the rear ends of the side members to lie transverse to and behind the steerable-wheel-supported end of the tractor with the side members extending forwardly to position their front ends in horizontal and transverse alinement forwardly of the axle housings, said side member front ends respectively having individual, transversely coaxial rockshaft carriers thereon; first tractor-engaging structure on the main frame adjacent to the rear ends of the side members; second tractor-engaging structure on the main frame adjacent to the front ends of the side members, said second structure including individual axle-housing-engaging brackets connected respectively to the side members and depending therefrom to afford individual, transversely spaced and alined mounting elements independent of the rockshaft carriers; an operator's station structure including an upright support having transversely spaced and alined lower end portions respectively proximate to the mounting elements, said supports including transversely spaced and alined higher portions respectively proximate to the side members behind and above the rockshaft carriers, a first pair of disconnectible securing means detachably connecting the support lower portions respectively to the mounting elements and a second pair of disconnectible securing means separate from said first pair and detachably connecting the support higher portions respectively to the side members above and independently of the rockshaft carriers; and a harvesting unit below the station structure and ahead of the rockshaft carriers and including transversely spaced apart fore-and-aft lift arms projecting toward and having rear ends proximate to the rockshaft carriers, and a transverse rockshaft cross-connecting the rear ends of the lift arms and demountably receivable in the aforesaid rockshaft carriers independently of the station structure to enable dismounting of the cotton-picking unit and separation thereof in a forward direction from the main frame and main-frame-supported station structure.

2. The invention defined in claim 1, in which: each rockshaft carrier includes a first rockshaft-embracing bearing half affixed to the respective side member, and a complementary second rockshaft-embracing bearing half removably secured to its first bearing half.

3. The invention defined in claim 1, in which: the aforesaid first pair of disconnectible securing means comprises coaxial pivots on a transverse axis about which the station structure can be swung downwardly and forwardly upon disconnection of the second pair of disconnectible means after forward separation of the cotton-picking unit from the main frame.

4. The invention defined in claim 1, in which: each axle-housing-engaging bracket is detachably secured to the respective side member so as to remain on the respective axle housing for enabling removal of the main frame, each bracket having an upper plate portion provided with an upright stud and each side member having an under portion apertured to receive and be upwardly removed from the respective stud.

5. The invention defined in claim 4, in which, each side member under portion is in the form of a fore-and-aft shoe having an upwardly and forwardly inclined ramp for guiding the side member into position on its respective bracket and stud.

6. The invention defined in claim 1, in which: the rockshaft includes a lock arm fixed thereto and extending rearwardly alongside one of the side members, and said one side member has therein a selectively adjustable element variably engageable with the stop arm to limit rocking movement of the stop arm and rockshaft in one direction.

7. A harvester attachment for drive-in drive-out mounting on and dismounting from an agricultural tractor of the type conventionally having a narrow fore-and-aft body supported at opposite ends respectively on a steerable wheel and on a pair of widely spaced coaxial traction wheels journaled respectively on transverse axle housings and unconventionally driven in a reverse direction so that the steerable-wheel-supported end of the body is the rear end and the traction-wheels-supported end of the body is the front end, said attachment comprising: an elongated main frame having front and rear ends and made up of a pair of side members and a transverse member cross-connecting the side members at and closing the rear end of the frame and leaving the front end open to embrace the tractor from the steerable-wheel-supported end thereof, with the transverse member across and behind the steerable-wheel-supported end of the body and the side members extending forwardly respectively along opposite sides of the body above and projecting forwardly beyond the respective axle housings at the open front end of said frame; rear mounting and dismounting structure at the rear end of the frame, including tractor-body-engaging elements on the side members having means thereon for detachable affixation to the body adjacent to the steerable-wheel-supported end thereof; front mounting and dismounting structure at the front end of the frame, including a pair of individual support elements connected respectively to the side members of the frame and having means thereon for detachable affixation respectively to the axle housings; a harvesting unit forwardly of the front end of the main frame and ahead of the axle housings; unit-mounting means at the front end of the main frame, including a rockshaft traversing and closing said front end, lift arms affixed to the rockshaft and extending forwardly and connected to the unit, and a pair of individual rockshaft mounts, one mounted directly and exclusively on each side member at the front end of the main frame and each detachably supporting the rockshaft for removal thereof to re-open the forward end of the main frame.

8. A harvester attachment for drive-in drive-out mounting on and dismounting from an agricultural tractor of the type having a narrow fore-and-aft body conventionally equipped with a forward power plant and a rear power lift system having a transverse, rockable lift member, wherein the body is conventionally supported at opposite ends respectively on a steerable wheel and on a pair of widely spaced coaxial traction wheels journaled respectively on transverse axle housings and unconventionally driven in a reverse direction so that the steerable-wheel-supported end of the body trails the traction-wheels-supported end of the body, said attachment comprising: an elongated main frame having front and rear ends and made up of a pair of side members and a transverse member cross-connecting the side members at and closing the rear end of the frame and leaving the front end open to embrace the tractor from the steerable-wheel-supported end thereof, with the transverse member across and behind the steerable-wheel supported end of the body and the side members extending forwardly respectively along opposite sides of the body above and projecting forwardly beyond the rockable lift member; rear mounting and dismounting structure at the rear end of the frame, including tractor-body-engaging elements having means thereon for detachable affixation to the body adjacent to the steerable-wheel-supported end thereof; front mounting and dismounting structure at the front end of the frame, including a pair of individual support elements connected respectively to the side members of the frame and having means thereon for detachable affixation respectively to the axle housings; a harvesting unit forwardly of the front end of the main frame and ahead of the axle housings; unit-mounting means at the front end of the main frame, including a rockshaft traversing and closing said front end and lying ahead of the rockable lift member, lift arms affixed to the rockshaft and extending forwardly and connected to the unit, a pair of individual rockshaft mounts, one mounted directly and exclusively on each side member at the front end of the main frame and each detachably supporting the rockshaft for removal thereof to re-open the forward end of the main frame, and a power input arm fixed to the rockshaft and having rearwardly an extending force-receiving connection detachably connected to the rockable lift member.

9. A harvester attachment for drive-in, drive-out mounting on and dismounting from an agricultural tractor of the type conventionally having opposite ends supported respectively on a steerable wheel and on widely spaced coaxial traction wheels journaled respectively on opposite transverse axle housings and unconventionally driven in a reverse direction so that the steerable-wheel-supported end of the tractor is the rear end and the traction-wheels-supported end is the front end, said attachment comprising: an elongated tractor-receiving main frame having a pair of fore-and-aft side members spaced apart transversely to lie respectively along opposite sides of the body and respectively including transversely and horizontally alined front end portions above and proximate respectively to the axle housings; individual support means on the front ends of the side members, each support means including an upright mounting element having a lower part detachably secured to the respective axle housing at a level below the respective side member and an upper part sustaining the respective side member, the lower parts of the mounting elements being respectively apertured in transverse alinement to afford a transverse pivot axis ahead of the axle housings; an operator's station having an upright support including transversely spaced and alined apertured lower parts respectively registrable with the aforesaid lower parts and further including higher parts transversely spaced and alined at a level above said lower parts; a pair of first securing means pivotally connecting the registered apertured lower parts; and a pair of second securing means connecting the higher parts of the station structure to the side members, said second means being disconnectible to enable downward and forward swinging of the station structure about the aforesaid pivot axis, and said first securing means being disconnectible to enable subsequent detachment of the station structure from the mounting elements.

10. A harvester attachment for drive-in, drive-out mounting on and dismounting from an agricultural tractor of the type conventionally having opposite ends supported respectively on a steerable wheel and on widely spaced coaxial traction wheels journaled respectively on opposite transverse axle housings and unconventionally driven in a reverse direction so that the steerable-wheel-supported end of the tractor is the rear end and the traction-wheels-supported end is the front end, said attachment comprising: an elongated tractor-receiving main frame having a pair of fore-and-aft side members spaced apart transversely to lie respectively along opposite sides of the body and respectively including transversely and horizontally alined front end portions above and proximate respectively to the axle housings; individual support means on the front ends of the side members, each support means including an upright mounting element having a lower part detachably secured to the respective axle housing at a level below the respective side member and an upper part sustaining the respective side member; an operator's station having an upright support including transversely spaced and alined lower parts respectively proximate to the aforesaid lower parts and further including higher parts transversely spaced and alined at a level above said lower parts; a pair of first securing means pivotally connecting the proximate lower parts on a transverse pivot axis; and a pair of second securing means connecting the higher parts of the station structure to the side members, said second means being disconnectible to enable downward and forward swinging of the station structure about the aforesaid pivot axis, and said first securing means being disconnectible to enable subsequent detachment of the station structure from the mounting elements.

11. A harvester attachment for drive-in, drive-out mounting on and dismounting from an agricultural tractor of the type conventionally having opposite ends supported respectively on a steerable wheel and on widely spaced coaxial traction wheels journaled respectively on opposite transverse axle housings and unconventionally driven in a reverse direction so that the steerable-wheel-supported end of the tractor is the rear end and the traction-wheels-supported end is the front end, said attachment comprising: an elongated tractor-receiving main frame having a pair of fore-and-aft side members spaced apart transversely to lie respectively along opposite sides of the body and respectively including transversely and horizontally alined front end portions above and proximate respectively to the axle housing; first tractor-engaging structure on the main frame adjacent to the rear ends of the side members; second tractor-engaging structure on the main frame adjacent to the front ends of the side members, said second structure including individual brackets, one for each side member and the proximate axle housing, each bracket including an upper flat plate portion on which its side member rests and a depending plate part having means thereon detachably connectible to the proximate axle housing, each upper plate portion having an upright stud fixed thereto and rising therefrom and each side member having an apertured under portion receiving the proximate stud; and a pair of releasable securing means connecting the side members respectively to the brackets.

12. A harvester attachment for drive-in, drive-out mounting on and dismounting from an agricultural tractor of the type conventionally having opposite ends supported respectively on a steerable wheel and on widely spaced coaxial traction wheels journaled respectively on opposite transverse axle housings and a power take-off shaft located laterally intermediate the axle housings and wherein such tractor is unconventionally driven in a reverse direction so that the steerable-wheel-supported end of the tractor is the rear end and the traction-wheels-supported end is the front end, said attachment comprising: an elongated tractor-receiving main frame having a pair of fore-and-aft side members spaced apart transversely to lie respectively along opposite sides of the body and respectively including transversely and horizontally alined front end portions above and proximate respectively to the axle housings; first tractor-engaging structure on the main frame adjacent to the rear ends of the side members; second tractor-engaging structure on the main frame adjacent to the front ends of the side members, said second structure including individual brackets, one for each side member and the proximate axle housing, each bracket including an upper flat plate portion on which its side member rests, a depending plate part having means thereon detachably connectible to the proximate axle housing, and a support portion including a drive member rotatable thereon in transverse alinement with the tractor power take-off shaft; and a pair of releasable securing means connecting the side members respectively to the brackets.

13. A harvester attachment for drive-in, drive-out mounting on and dismounting from an agricultural tractor of the type conventionally having opposite ends supported respectively on a steerable wheel and on widely spaced coaxial traction wheels journaled respectively on opposite transverse axle housings and unconventionally driven in a reverse direction so that the steerable-wheel-supported end of the tractor is the rear end and the traction-wheels-supported end is the front end, said attachment comprising: an elongated tractor-receiving main frame having a pair of fore-and-aft side members spaced apart transversely to lie respectively along opposite sides of the body and respectively including transversely and horizontally alined front end portions above and proximate respectively to the axle housings; first tractor-engaging structure on the main frame adjacent to the rear ends of the side members; second tractor-engaging structure on the main frame adjacent to the front ends of the side members, said second structure including individual brackets, one for each side member and the proximate axle housing, each bracket including an upper flat plate portion on which its side member rests; a harvesting unit ahead of the front end of the frame; means connecting the unit to the front end of the frame, including a transverse rockshaft rockably supported on the front ends of the side members; a stop arm on the rockshaft extending rearwardly alongside one side member for vertically swinging movement with the rockshaft; and stop means carried by said one side member and projecting laterally above and into the path of vertical movement of the stop arm, said stop means including a vertically adjustable member engageable with the stop arm to limit upward movement of said arm.

14. The invention defined in claim 13, in which: the stop means comprises a laterally outwardly projecting loop loosely embracing the stop arm and having upper and lower transverse portions lying respectively above and below said arm, said upper portion having a threaded aperture therein on a vertical axis, and the aforesaid vertically adjustable member is cooperatively threaded through said aperture to adjustably engage the stop arm.

15. In a harvesting attachment for an agricultural tractor having a narrow fore-and-aft body including front and rear ends supported respectively on a front steerable wheel and rear traction wheels and conventionally equipped with an operator's seat at the rear end of the body, a steering wheel ahead of the seat and mounted on a fore-and-aft steering shaft, and upright support means rising from the body in laterally fixed relation to the steering shaft and ahead of the steering wheel: an auxiliary operator's station comprising a horizontal platform having leg means depending therefrom and provided with a lower end portion detachably positionable at the rear end of the tractor body to dispose the platform at a level above the tractor seat; an auxiliary steering wheel mounted on the platform to lie rearwardly of the tractor steering wheel; an auxiliary steering shaft journaled on the platform and connected to the auxiliary steering wheel and extending forwardly to a front end ahead of the tractor steering wheel and laterally offset from the tractor steering shaft and from the tractor upright support means; a rotary driving member fixed to the front end of the auxiliary steering shaft; a rotary driven member including complementary parts to embrace the tractor steering shaft in transverse alinement with the driving member, and releasable means securing said parts together for rotation in unison with the tractor steering shaft; endless drive-transmitting means trained about and extending between the driving and driven members; bearing means journaling the front end of the auxiliary steering shaft; and means supporting the bearing means, including an element extending from the bearing means to engage the upright support means on the tractor, said element being transversely adjustable to adjust the front end of the auxiliary steering shaft relative to the tractor steering shaft for varying the tension on the drive-transmitting means.

16. The invention defined in claim 15, in which: the bearing supporting means includes a bracket, the element has a first end connected to the bracket and a second end proximate to the upright support means on the tractor, and said element has at its second end a cam device engageable with the upright support means on the tractor.

17. The invention defined in claim 16, in which: the connection of the element to the bracket includes provision for transverse adjustment of the element relative to the bracket to supplement transverse adjustment obtained via the cam device.

18. In a harvesting attachment having a narrow fore-and-aft body including front and rear ends supported respectively on a front steerable wheel and rear traction wheels and conventionally equipped with an operator's seat at the rear end of the body, a steering wheel ahead of the seat and mounted on a fore-and-aft steering shaft, and upright support means rising from the body in laterally fixed relation to the steering shaft and ahead of the steering wheel: an auxiliary operator's station comprising a horizontal platform; mounting means thereon detachably connectible to the tractor body to rigidly position the platform in spaced relation to the tractor seat; an auxiliary steering wheel mounted on the platform to lie spaced from the tractor steering wheel; an auxiliary steering shaft journaled on the platform and having a first portion connected to the auxiliary steering wheel and a second portion laterally offset from and alongside of the tractor steering shaft and upright support means; a rotary driving member fixed to the second portion of the auxiliary steering shaft; a rotary driven member including complementary parts to embrace the tractor steering shaft in transverse alinement with the driving member, and releasable means securing said parts together for rotation in unison with the tractor steering shaft; endless drive-transmitting means trained about and extending between the driving and driven members; bearing means journaling the second portion of the auxiliary steering shaft; and means supporting the bearing means, including an element extending from the bearing means to engage the upright support means on the tractor, said element being transversely adjustable to adjust the second portion of the auxiliary steering shaft relative to the tractor steering shaft for varying the tension on the drive-transmitting means.

19. In a harvesting attachment for an agricultural tractor having a narrow fore-and-aft body supported on traction wheels and conventionally equipped with a power plant and a change-speed transmission of the type having a control lever shiftable transversely of the tractor between forward and reverse positions and an operator's seat adjacent to the control lever: an auxiliary operator's station comprising supporting structure connectible to the tractor and including an auxiliary operator's seat in fore-and-aft spaced relation to the tractor seat and relatively remote from the tractor control lever; a fore-and-aft rockshaft rockably carried by the supporting structure and having a first end proximate to the control lever and a second end proximate to the auxiliary seat; an auxiliary control lever fixed to the second end of the rockshaft and convenient to the auxiliary seat; an actuating arm fixed to the first end of the rockshaft for transverse swinging thereof as an incident to rocking of the rockshaft; and force-transmitting means having a first end connected to the arm and a second end including means for connection to the tractor control lever for shifting the tractor control lever between its forward and reverse positions in response to rocking of the rockshaft by the auxiliary control lever.

20. In a harvesting attachment for an agricultural tractor having a narrow fore-and-aft body supported on traction wheels and conventionally equipped with a power plant and a change-speed transmission of the type having a control lever shiftable transversely of the tractor between forward and reverse positions and an operator's seat adjacent to the control lever: an auxiliary operator's station comprising supporting structure connectible to the tractor and including an auxiliary operator's seat spaced rearwardly from and above the tractor seat and relatively remote both vertically and rearwardly from the tractor control lever; a fore-and-aft rockshaft rockably carried by the supporting structure at the level of the tractor control lever and having a front end proximate to the tractor control lever and a rear end in vertical alinement with but spaced below the auxiliary seat; an auxiliary control lever fixed to the rear end of the rockshaft and rising therefrom for convenient location relative to the auxiliary seat; an actuating arm fixed to the front end of the rockshaft for transverse swinging thereof as an incident to rocking of the rockshaft; and a force-transmitting link having a first end connected to the arm and a second end including means for connection to the tractor control lever for shifting the tractor control lever between its forward and reverse positions in response to rocking of the rockshaft by the auxiliary control lever.

21. A harvester attachment for drive-in, drive-out mounting on and dismounting from an agricultural tractor of the type conventionally having a narrow fore-and-aft body supported at opposite ends respectively on a steerable wheel and on a pair of widely spaced coaxial traction wheels journaled respectively on transverse axle housings and unconventionally driven in a reverse direction so that the steerable-wheel-supported end of the body is the rear end and the traction-wheels-supported end of the body is the front end, said attachment comprising: an elongated main frame having front and rear ends and made up of a pair of side members and a transverse member cross-connecting the side members at and closing the rear end of the frame and leaving the front end open to embrace the tractor from the steerable-wheel-supported end thereof, with the transverse member across and behind the steerable-wheel-supported end of the body and the side members extending forwardly respectively along opposite sides of the body above and projecting forwardly beyond the respective axle housings at the open front end of said frame; rear mounting and dismounting structure at the rear end of the frame, including tractor-body-engaging elements on the side members having means thereon for detachable affixation to the body adjacent to the steerable-wheel-supported end thereof; rear mounting and dismounting structure at the front end of the frame, including a pair of individual axle-housing-engaging brackets connected respectively to the side members of the frame and having means thereon for detachable affixation respectively to the axle housings; a harvesting unit forwardly of the front end of the main frame and ahead of the axle housings, said unit having a lower portion proximate to the ground and an upper portion spaced above the ground; unit-mounting means at the front end of the main frame, including a transverse rockshaft and a pair of individual carriers connected to the rockshaft and connected respectively to the frame side members and lift arms on and extending forwardly from the rockshaft and connected to the upper portion of the unit; and stabilizer means connected to the lower portion of the unit and to one of the aforesaid individual axle-housing-engaging brackets.

22. The invention defined in claim 21, in which: the stabilizer means includes a torsion shaft extending transversely from said one bracket, a depending arm rigid on the shaft, and a link connected to the arm and to said lower portion of the unit.

23. A harvester attachment for drive-in, drive-out mounting on and dismounting from an agricultural tractor of the type conventionally having opposite ends supported respectively on a steerable wheel and on widely spaced coaxial traction wheels journaled respectively on opposite transverse axle housings and a power take-off shaft located laterally intermediate the axle housings and wherein such tractor is unconventionally driven in a reverse direction so that the steerable-wheel-supported end of the tractor is the rear end and the traction-wheels-supported end is the front end, said attachment comprising: an elongated tractor-receiving main frame having a pair of fore-and-aft side members spaced apart transversely to lie respectively along opposite sides of the body and respectively including transversely and horizontally alined front end portions above and proximate respectively to the axle housings; individual support means on the front ends of the side members, each support means including an upright mounting element having a lower part detachably secured to the respective axle housing at a level below the respective side member and an upper part sustaining the respective side member; a harvesting unit ahead of the front end portions of the main frame side members and including an input shaft and a crop-delivery conduit; a receptacle supported in the main frame; a blower supported on the main frame and having an inlet connected to the conduit, an outlet leading to the receptacle, and a rotary impeller having a driven shaft; first drive mechanism carried by the main frame adjacent to one individual support means and exclusive of the tractor and including an input member connected to the tractor power take-off shaft and an output shaft detachably connected to the harvester input shaft; and second drive mechanism carried by the main frame adjacent to the other individual support means and having an input member connected to the tractor power take-off shaft and an output member connected to the impeller driven shaft.

24. A harvester attachment for drive-in, drive-out mounting on and dismounting from an agricultural tractor of the type conventionally having opposite ends supported respectively on a steerable wheel and on widely spaced coaxial traction wheels journaled respectively on opposite transverse axle housings and a power take-off shaft located laterally intermediate the axle housings and wherein such tractor is unconventionally driven in a reverse direction so that the steerable-wheel-supported end of the tractor is the rear end and the traction-wheels-supported end is the front end, said attachment comprising: an elongated tractor-receiving main frame having a pair of fore-and-aft side members spaced apart transversely to lie respectively along opposite sides of the body and respectively including transversely and horizontally alined front end portions above and proximate respectively to the axle housings; individual support means on the front ends of the side members, each support means including an upright mounting element having a lower part detachably secured to the respective axle housing at a level below the respective side member and an upper part sustaining the respective side member; a harvesting unit ahead of the front end portions of the main frame side members and including an input shaft; and drive mechanism carried by the main frame adjacent to one individual support means and exclusive of the tractor and including an input member connected to the tractor power take-off shaft and an output shaft detachably connected to the harvester input shaft; and second drive mechanism carried by the main frame adjacent to the other individual support means and having an input member connected to the tractor power take-off shaft and an output member connected to the impeller driven shaft.

25. A harvester attachment for drive-in, drive-out mounting on and dismounting from an agricultural tractor of the type conventionally having a narrow fore-and-aft body supported at opposite ends respectively on a steerable wheel and on a pair of widely spaced coaxial traction wheels journaled respectively on transverse axle housings and unconventionally driven in a reverse direction so that the steerable-wheel-supported end of the body is the rear end and the traction-wheels-supported end of the body is the front end, said attachment comprising: an elongated main frame having front and rear ends and made up of a pair of side members and a transverse member cross-connecting the side members at and closing the rear end of the frame and leaving the front end open to embrace the tractor from the steerable-wheel-supported end thereof, with the transverse member across and behind the steerable-wheel-supported end of the body and the side members extending forwardly respectively along opposite sides of the body above and projecting forwardly beyond the respective axle housings at the open front end of said frame; rear mounting and dismounting structure at the rear end of the frame, including a transverse member having opposite end portions provided with means for detachably engaging the side members and an intermediate portion provided with tractor-body-engaging elements for detachable affixation to the steerable-wheel-supported end of the tractor body, said transverse member further having additional tractor-body-engaging elements adjustable in vertical directions to level the side members; front mounting and dismounting structure at the front end of the frame, including a pair of individual support elements connected respectively to the side members of the frame and having means thereon for detachable affixation respectively to the axle housings; a harvesting unit forwardly of the front end of the main frame and ahead of the axle housings; unit-mounting means at the front end of the main frame, including a rockshaft traversing and closing said front end, lift arms affixed to the rockshaft and extending forwardly and connected to the unit, and a pair of individual rockshaft mounts, one mounted directly and exclusively on each side member at the front end of the main frame and each detachably supporting the rockshaft for removal thereof to re-open the forward end of the main frame.

26. A self-propelled harvester, comprising: a mobile main frame having front and rear ends and opposite sides; a harvesting unit carried by the frame at the front end thereof; a crop-receiving receptacle carried by the frame behind the harvesting unit; an operator's station carried by the frame ahead of the receptacle and at a level above the harvesting unit; conveying means for transferring crops from the harvesting unit to the receptacle, including a fan housing at one side of the frame, a first conduit connected at one end to the harvesting unit and at its other end to the fan housing and a second conduit connected from the fan housing to the receptacle, said first conduit having a portion lying outwardly of the fan housing at said one side of the frame; a support for the fan housing; and a combined guard and guide rail carried by the fan housing support and protectively encircling said first conduit portion and serving as a guide to an operator on the operator's station to gauge the position of the machine relative to objects external to the machine.

27. A self-propelled harvester, comprising: a mobile main frame having front and rear ends and opposite sides; a harvesting unit carried by the frame at the front end thereof; a crop-receiving receptacle carried by the frame behind the harvesting unit; an operator's station carried by the frame ahead of the receptacle and at a level above the harvesting unit; conveying means for transferring crops from the harvesting unit to the receptacle, including a portion projecting outwardly of the frame and receptacle at one side of the frame; and a combined guard and guide rail mounted on the frame and protectively encircling said portion and serving as a guide to an operator on the operator's station to gauge the position of the machine relative to objects external to the machine.

References Cited in the file of this patent
UNITED STATES PATENTS

| | | |
|---|---|---|
| 2,518,465 | Hagen et al. | Aug. 15, 1950 |
| 2,520,927 | Hagen | Sept. 5, 1950 |
| 2,649,677 | Paradise | Aug. 25, 1953 |